US011949158B2

(12) United States Patent
Zhang et al.

(10) Patent No.: US 11,949,158 B2
(45) Date of Patent: Apr. 2, 2024

(54) ANTENNA AND MOBILE TERMINAL

(71) Applicant: Beijing Xiaomi Mobile Software Co., Ltd., Beijing (CN)

(72) Inventors: Lupeng Zhang, Beijing (CN); Xiaochao Duan, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 361 days.

(21) Appl. No.: 15/931,023

(22) Filed: May 13, 2020

(65) Prior Publication Data

US 2021/0218145 A1 Jul. 15, 2021

(30) Foreign Application Priority Data

Jan. 13, 2020 (CN) ........................ 202010033914.3

(51) Int. Cl.

| | |
|---|---|
| ***H01Q 13/18*** | (2006.01) |
| ***H01Q 1/24*** | (2006.01) |
| ***H01Q 1/52*** | (2006.01) |
| ***H01Q 13/10*** | (2006.01) |
| ***H01Q 21/00*** | (2006.01) |
| ***H01Q 21/06*** | (2006.01) |
| ***H01Q 21/08*** | (2006.01) |

(52) U.S. Cl.

CPC ............ *H01Q 13/18* (2013.01); *H01Q 1/243* (2013.01); *H01Q 1/52* (2013.01); *H01Q 1/523* (2013.01); *H01Q 13/106* (2013.01); *H01Q 21/0043* (2013.01); *H01Q 21/064* (2013.01); *H01Q 21/08* (2013.01); *H01Q 13/10* (2013.01)

(58) Field of Classification Search

CPC ..... H01Q 13/18; H01Q 1/243; H01Q 21/0043

See application file for complete search history.

(56) References Cited

U.S. PATENT DOCUMENTS

| | | | | |
|---|---|---|---|---|
| 6,606,071 | B2 * | 8/2003 | Cheng ...................... | H01Q 9/42 343/700 MS |
| 6,670,923 | B1 | 12/2003 | Kadambi et al. | |
| 10,454,167 | B2 * | 10/2019 | Yu ........................ | H01Q 9/0457 |
| 10,522,900 | B2 * | 12/2019 | Khripkov ............... | H01Q 1/243 |
| 10,727,600 | B1 * | 7/2020 | Saeidi .................. | H01Q 9/0407 |
| 10,903,563 | B2 * | 1/2021 | Kang ................... | H01Q 9/0421 |
| 10,978,783 | B2 * | 4/2021 | Zhu .......................... | H01Q 3/38 |

(Continued)

FOREIGN PATENT DOCUMENTS

| | | |
|---|---|---|
| CN | 106711616 A | 5/2017 |
| CN | 107946738 A | 4/2018 |

(Continued)

OTHER PUBLICATIONS

Supplementary European Search Report in European Application No. 20176998.1, dated Nov. 11, 2020.

*Primary Examiner* — Ab Salam Alkassim, Jr.

(74) *Attorney, Agent, or Firm* — Finnegan, Henderson, Farabow, Garrett & Dunner, L.L.P.

(57) ABSTRACT

An antenna includes: an antenna body; and a plurality of slot antenna units provided on the antenna body and arranged to be a slot antenna array, wherein each of the plurality of slot antenna units includes a cavity formed within the antenna body and a slot penetrating through a surface of the antenna body, and the slot and the cavity have sizes to enable transmission of millimeter waves in 5th generation (5G) mobile communication.

20 Claims, 4 Drawing Sheets

(56) References Cited

U.S. PATENT DOCUMENTS

| | | | | |
|---|---|---|---|---|
| 2005/0200531 | A1* | 9/2005 | Huang | H01Q 19/026 343/893 |
| 2008/0129625 | A1* | 6/2008 | Svensson | H01Q 21/205 343/767 |
| 2010/0321265 | A1* | 12/2010 | Yamaguchi | H01Q 21/0043 343/771 |
| 2011/0148726 | A1* | 6/2011 | Chang | H01Q 13/10 343/770 |
| 2011/0181482 | A1* | 7/2011 | Adams | H01Q 25/001 343/771 |
| 2012/0038503 | A1 | 2/2012 | Kodama | |
| 2014/0176378 | A1* | 6/2014 | Yu | H01Q 21/30 343/767 |
| 2014/0184450 | A1* | 7/2014 | Koo | H01Q 1/2266 343/702 |
| 2015/0263430 | A1* | 9/2015 | Lin | H01Q 5/40 343/767 |
| 2016/0351996 | A1* | 12/2016 | Ou | H01Q 1/243 |
| 2017/0110787 | A1* | 4/2017 | Ouyang | H01Q 1/42 |
| 2017/0201011 | A1* | 7/2017 | Khripkov | H01Q 1/42 |
| 2017/0294705 | A1* | 10/2017 | Khripkov | H01Q 1/38 |
| 2018/0062256 | A1* | 3/2018 | Kim | H01Q 1/525 |
| 2018/0183150 | A1* | 6/2018 | Sienkiewicz | H01Q 1/38 |
| 2018/0254541 | A1* | 9/2018 | Xiong | H01Q 1/243 |
| 2019/0006738 | A1* | 1/2019 | Yu | H01Q 15/18 |
| 2019/0006739 | A1* | 1/2019 | Yu | H01Q 15/18 |
| 2019/0006766 | A1* | 1/2019 | Yonei | H01Q 13/16 |
| 2019/0229401 | A1* | 7/2019 | Yong | H01Q 21/062 |
| 2020/0052415 | A1* | 2/2020 | Choon | H01Q 21/08 |
| 2020/0067177 | A1* | 2/2020 | Wang | H01Q 1/242 |
| 2020/0106157 | A1* | 4/2020 | Tran | H01Q 1/2291 |
| 2020/0212544 | A1* | 7/2020 | Kwon | H01Q 5/40 |
| 2021/0135336 | A1* | 5/2021 | Ke | H01Q 21/064 |
| 2021/0218145 | A1* | 7/2021 | Zhang | H01Q 21/064 |
| 2021/0328364 | A1* | 10/2021 | Jia | H01Q 9/0435 |
| 2021/0399428 | A1* | 12/2021 | Suzuki | H01Q 13/10 |
| 2022/0131276 | A1* | 4/2022 | Kim | H04M 1/026 |

FOREIGN PATENT DOCUMENTS

| | | | |
|---|---|---|---|
| CN | 109449568 | A | 3/2019 |
| CN | 109994818 | A | 7/2019 |
| CN | 110034386 | A | 7/2019 |
| JP | 2013026860 | A | 2/2013 |
| JP | 2013037653 | A | 2/2013 |
| JP | 2014170989 | A | 9/2014 |
| JP | 2017228982 | A | 12/2017 |
| JP | 2019205090 | A | 11/2019 |
| KR | 20010021105 | A | 3/2001 |
| KR | 20100005071 | A | 1/2010 |

* cited by examiner

ANTENNA AND MOBILE TERMINAL

CROSS-REFERENCE TO RELATED APPLICATION

The present application is based on and claims priority to Chinese Patent Application No. 202010033914.3 filed on Jan. 13, 2020, the entirety of which is incorporated herein by reference.

TECHNICAL FIELD

The disclosure relates to the technical field of communication, and in particular to an antenna and a mobile terminal.

BACKGROUND

With rapid development of communication technologies, users have higher requirements on smart terminal devices. Meanwhile, the $5^{th}$ generation (5G) mobile communication network will be improved in speed, stability, reliability and low-delay performance, thus implementing many scenarios that cannot be accomplished in the 4th generation (4G) mobile communication network.

In response to development of 5G communication, a communication device, e.g., a mobile terminal, needs to be provided with a suitable antenna to realize communication of the mobile terminal.

SUMMARY

According to a first aspect of embodiments of the disclosure, an antenna includes: an antenna body; and a plurality of slot antenna units provided on the antenna body and arranged to be a slot antenna array, wherein each of the plurality of slot antenna units includes a cavity formed within the antenna body and a slot penetrating through a surface of the antenna body, and the slot and the cavity have sizes to enable transmission of millimeter waves in 5th generation ("5G") mobile communication.

According to a second aspect of embodiments of the disclosure, a mobile terminal includes: a metal frame and an antenna. The antenna includes: an antenna body; and a plurality of slot antenna units provided on the antenna body and arranged to be a slot antenna array, wherein each of the plurality of slot antenna units includes a cavity formed within the antenna body and a slot penetrating through a surface of the antenna body, and the slot and the cavity have sizes to enable transmission of millimeter waves in 5G mobile communication, and wherein the antenna body is part of the metal frame.

The technical solutions provided in the embodiments of the disclosure may have the following beneficial effects. According to the disclosure, by means of an antenna body and a plurality of slot antenna units arranged as a slot antenna array on the antenna body in the antenna, a 5G-millimeter-wave antenna suitable for 5G communication can be constructed at a mobile terminal, so as to implement data transmission of the mobile terminal through a 5G data transmission network.

It is to be understood that the general description above and detailed description later are merely exemplary and explanatory, and are not intended to restrict the disclosure.

BRIEF DESCRIPTION OF THE DRAWINGS

The accompanying drawings herein are incorporated into the specification and constitute part of the present specification, illustrate embodiments consistent with the disclosure and are intended for explaining the principles of the disclosure together with the specification.

DETAILED DESCRIPTION

Detailed description will be made here to exemplary embodiments, examples of which are illustrated in the accompanying drawings. When the drawings are referred to in the following description, identical numerals in different drawings refer to identical or similar elements, unless otherwise indicated. Implementations described in the following exemplary embodiments do not represent all the implementations consistent with the disclosure. On the contrary, they are merely examples of apparatuses and methods consistent with some aspects of the disclosure detailed in the appended claims.

In the following description, the terms "front", "top", "bottom", etc. indicate orientations and positional relations based on the accompanying drawings, and are provided for illustration of the embodiments, and do not indicate or imply that devices or elements have to be in a specific orientation or constructed or operated in a specific orientation, and thus cannot be construed as limiting the scope of the disclosure. It is to be noted that relative arrangement of components, numeric expressions and numeric values described in the embodiments do not limit the scope of the disclosure, unless otherwise indicated.

With users having higher requirements on mobile communication devices and rapid development of communication technologies, technical requirements on mobile communication devices also become higher. The mobile communication technologies have evolved from the 2nd generation (2G) technology to the 5th generation (5G) technology.

The 5G network refers to the 5th generation mobile network. The 5G network is a new generation of cellular mobile communication technology, and has the advantages of a high data rate, a reduced delay, power saving, reduced costs, and an improved system capacity, and is capable of realizing connection for a large number of devices, etc. The main advantage of 5G is that its data transmission rate is much higher than that of previous cellular networks, and can reach up to 10 Gbit/s, which is about 100 times faster than the data transmission rate of 4G.

As a transmission medium in a mobile communication network, an antenna can convert guided waves propagating in a transmission line into electromagnetic waves propagating in an unbounded medium or a free space. With development of 5G, requirements on antennas of mobile terminals are higher. Therefore, antennas become a key element in a 5G mobile communication network.

Embodiments of the disclosure provide an antenna, which may be applied to a mobile terminal, for example a mobile phone or a tablet.

Figure 1:
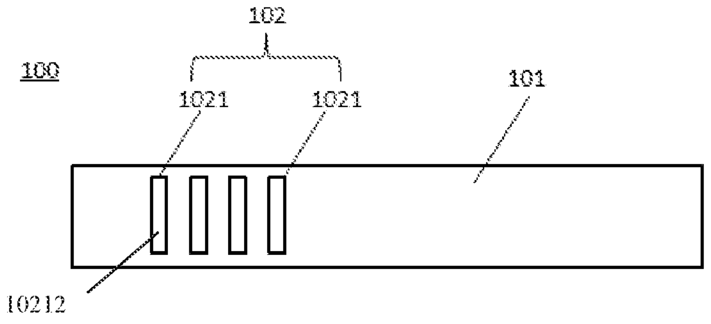
FIG. 1 illustrates a schematic top view of a structure of an antenna according to an exemplary embodiment of the disclosure.
Figure 2:
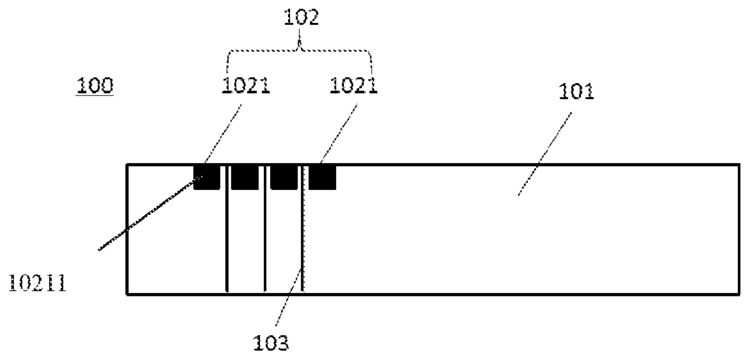
FIG. 2 illustrates a schematic sectional view of an antenna according to an exemplary embodiment of the disclosure.
Figure 3:
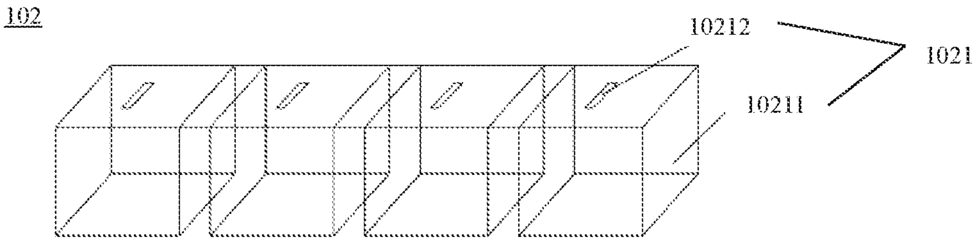
FIG. 3 illustrates a schematic structural diagram of an array of slot antenna units in an antenna according to an exemplary embodiment of the disclosure.

FIG. 1 illustrates a schematic top view of a structure of an antenna 100 according to an exemplary embodiment of the disclosure. FIG. 2 illustrates a schematic sectional view of the antenna 100 according to an exemplary embodiment of the disclosure. FIG. 3 illustrates a schematic structural diagram of an array of slot antenna units in the antenna 100 according to an exemplary embodiment of the disclosure.

As illustrated in FIG. 1, FIG. 2 and FIG. 3, the antenna 100 includes an antenna body 101, and a plurality of slot antenna units 1021 arranged on the antenna body 101. The plurality of slot antenna units 1021 are arranged to be an array 102 of slot antenna units (i.e., a slot antenna array 102).

The antenna body 101 is a structural framework of the antenna 100. The antenna body 101 may be made of a metal material, and may be understood as a metal frame.

The array 102 of slot antenna units is composed by several slot antenna units 1021. Each of the slot antenna units 1021 includes a cavity 10211 formed within the antenna body 101 and a slot 10212 penetrating through a surface of the antenna body 101.

The cavity 10211 may be made of a metal material.

The slot 10212 is provided on the surface of the antenna body 101. The cavity 10211 can penetrate through the outer surface of the antenna body 101 via the slot 10212. That is to say, the slot 10212 enables the cavity 10211 to be connected with the exterior.

In an exemplary embodiment, the cavity 10211 may be a feed system of the slot antenna unit 1021. In an exemplary embodiment, the slot antenna unit 1021 may transmit 5G millimeter waves via the slot 10212 penetrating through the surface of the antenna body 101.

The slot 10212 and the cavity 10211 have sizes to enable transmission of 5G millimeter waves.

Further, the size of the slot 10212 of the slot antenna unit 1021 is related to a wavelength of transmitted waves.

The size of the cavity 10211 of the slot antenna unit 1021 is related to an operating band of the transmitted waves. The correspondence between the size of the cavity and the operating band may be determined with reference to correspondences between sizes of flanges of waveguide cavities and frequencies of transmitted waves in different bands.

The array 102 of slot antenna units transmits 5G millimeter waves through each slot antenna unit 1021, and an array for transmitting 5G millimeter waves is formed by the plurality of slot antenna units 1021, so as to ensure effective transmission of 5G millimeter waves.

An operating band of 5G millimeter waves is different according to standards in different countries. The operating band of 5G millimeter waves is at 28 GHz in China.

In the embodiment, by means of an antenna body and an array of slot antenna units arranged on the antenna body in the antenna, a 5G-millimeter-wave antenna can be constructed at a mobile terminal, so as to implement data transmission of the mobile terminal through a 5G data transmission network.

In an exemplary embodiment of the disclosure, a length of the slot 10212 is greater than or equal to ¼ of an operating wavelength, and is smaller than or equal to ¾ of the operating wavelength. A width of the slot 10212 is smaller than or equal to 1/16 of the operating wavelength. The operating wavelength is determined according to a wavelength of waves transmitted by the array 102 of slot antenna units.

The size of the slot 10212 may determine whether 5G millimeter waves can be transmitted by the array 102 of slot antenna units effectively. When the length of the slot 10212 is greater than or equal to ¼ of the operating wavelength and is smaller than or equal to ¾ of the operating wavelength, and the width of the slot 10212 is smaller than or equal to 1/16 of the operating wavelength, 5G millimeter waves can be transmitted by the array 102 of slot antenna units effectively.

The operating wavelength is determined according to a wavelength of waves transmitted by the array 102 of slot antenna units. For example, the operating wavelength may be the wavelength of the waves transmitted by the array 102 of slot antenna units. Accordingly, the length of the slot 10212 may be greater than or equal to the wavelength of the waves transmitted by the array 102 of slot antenna units, and smaller than or equal to ¾ of the wavelength of the waves transmitted by the array 102 of slot antenna units. The width of the slot 10212 may be smaller than or equal to 1/16 of the wavelength of the waves transmitted by the array 102 of slot antenna units.

In an exemplary embodiment of the disclosure, the length of the slot 10212 may be ½ of the operating wavelength. If the operating wavelength is equal to the wavelength of the waves transmitted by the array 102 of slot antenna units, then the length of the slot 10212 may be ½ of the wavelength of the waves transmitted by the array 102 of slot antenna units.

In an exemplary embodiment of the disclosure, the cavity 10211 may be of a cubic shape. A size of the cavity 10211 is determined according to correspondences between standard guided waves and sizes of flanges.

A device capable of guiding electromagnetic waves to transmit directionally is referred to as a waveguide device. The electromagnetic waves guided to transmit directionally are referred to as guided electromagnetic waves, or guided waves for short. Standard guided waves may be understood as guided waves in different frequency bands which are divided based on international standards.

In an exemplary embodiment, a correspondence exists between the size of a flange of a waveguide device and a frequency of waves that the waveguide device can transmit. This is a correspondence between the standard guided waves and the size of the flange. For example, if the frequency of 5G millimeter waves transmitted by the array 102 of slot antenna units is within the range of 21.7 GHz to 33 GHz, then the length of the cavity 10211 is within the range of 8.616 mm to 8.656 mm, and the width of the cavity 10211 is within the range of 4.298 mm to 4.338 mm.

In an exemplary embodiment of the disclosure, the slot 10212 is filled with a dielectric material having a high dielectric constant and a low dielectric loss. The high dielectric constant may be understood as a dielectric constant greater than or equal to 4. The low dielectric loss refers to a dielectric loss lower than 2%. The dielectric material having a high dielectric constant and a low dielectric loss may be a resin material, a plastic material, or a dielectric substrate material.

In an exemplary embodiment of the disclosure, the operating wavelength is the wavelength of waves transmitted by the array 102 of slot antenna units. If the operating wavelength is the wavelength of the waves transmitted by the array 102 of slot antenna units, the length of the slot 10212 may be greater than or equal to the wavelength of the waves transmitted by the array 102 of slot antenna units, and smaller than or equal to ¾ of the wavelength of the waves transmitted by the array 102 of slot antenna units. The width of the slot 10212 may be smaller than or equal to 1/16 of the wavelength of the waves transmitted by the array 102 of slot antenna units.

In an exemplary embodiment of the disclosure, the operating wavelength is determined according to the wavelength of the waves transmitted by the array 102 of slot antenna units and the dielectric constant of the dielectric material filled in the slot 10212.

If the slot 10212 is filled with a dielectric material having a high dielectric constant and a low dielectric loss, the wavelength of the waves transmitted along the slot 10212 is the operating wavelength. Accordingly, the operating wavelength is related to the wavelength of the waves transmitted by the array 102 of slot antenna units and the dielectric constant of the dielectric material filled in the slot 10212. The operating wavelength is equal to a ratio of the wavelength of the waves transmitted by the array 102 of slot antenna units to a square root of the dielectric constant.

By means of filling the slot 10212 with the dielectric material having the high dielectric constant and the low dielectric loss, the operating wavelength is less than the wavelength of the waves transmitted by the array 102 of slot antenna units. The slot 10212 is miniaturized while ensuring a transmission efficiency, and thus the antenna for transmitting 5G millimeter waves is miniaturized.

In an exemplary embodiment of the disclosure, the cavity 10211 of the slot antenna unit 1021 may be filled with a dielectric material having a high dielectric constant and a low dielectric loss. The high dielectric constant may be a dielectric constant greater than or equal to 4. The low dielectric loss may be a dielectric loss lower than 2%.

In the embodiment, the cavity 10211 of the slot antenna unit 1021 is filled with the dielectric material having a high dielectric constant and a low dielectric loss, so that the cavity 10211 can be miniaturized, thus the antenna for transmitting 5G millimeter waves is miniaturized. That is to say, with the cavity 10211 of the slot antenna unit 1021 being small, 5G millimeter waves can still be well transmitted by filling the cavity with the dielectric material.

The dielectric material having a high dielectric constant and a low dielectric loss may also be a resin material, a plastic material, or a dielectric substrate material.

In an exemplary embodiment of the disclosure, the antenna body 101 is further provided with an isolation member 103 arranged between adjacent ones of the slot antenna units 1021.

Each of the slot antenna units 1021 can transmit signals in a form of 5G millimeter waves, and an array of signals in the form of 5G millimeter waves transmitted by the array 102 of slot antenna units is formed by the signals in the form of 5G millimeter waves transmitted by each slot antenna unit, so as to improve transmission of 5G millimeter waves. By providing the isolation member 103 between adjacent ones of the slot antenna units 1021, the signals in the form of 5G millimeter waves transmitted by the slot antenna units may not interfere each other, and the array of signals in the form of 5G millimeter waves can be normally transmitted by the array 102 of slot antenna units.

In an exemplary embodiment of the disclosure, an interval between slots 10212 of adjacent ones of the slot antenna units 1021 is within a range of ½ to one wavelength of waves transmitted by the array 102 of slot antenna units.

By controlling an interval between slots 10212 of adjacent ones of the slot antenna units 1021 to be within the range of ½ to one wavelength of the waves transmitted by the array 102 of slot antenna units, when the array 102 of slot antenna units performs scanning at a large angle, a main lobe has a good gain, and the influences of grating lobes on the main lobe can be reduced, improving transmission of 5G millimeter waves by the array 102 of slot antenna units.

In an exemplary embodiment of the disclosure, the array 102 of slot antenna units includes at least two slot antenna units 1021.

By providing at least two slot antenna units 1021 in the array 102 of slot antenna units, an array for transmitting 5G millimeter waves can be formed, and effective transmission of the 5G millimeter waves can be ensured.

The number of slot antenna units 1021 in the array 102 of slot antenna units may be determined according to practical situations. For example, if the antenna 100 is provided on a mobile terminal, the antenna body 101 of the antenna 100 may be a metal frame of the mobile terminal. Due to limitation of the size of the metal frame of the mobile terminal, the size of the antenna body 101, namely the number of slot antenna units 1021 in the array 102 of slot antenna units on the mobile terminal, will be limited correspondingly.

In an exemplary embodiment of the disclosure, the array 102 of slot antenna units is configured to transmit 5G millimeter waves.

The standards of an operating band of 5G millimeter waves are different in different countries. The operating band of 5G millimeter waves is at 28 GHz in China.

For transmission of 5G millimeter waves under standards in other countries, sizes of the cavity 10211 and the slot 10212 of each slot antenna unit 1021 in the array 102 of slot antenna units may be adjusted to transmit 5G millimeter waves in these countries.

In an exemplary embodiment of the disclosure, the antenna body 101 is a metal frame of the mobile terminal. The mobile terminal may be a mobile phone or a tablet.

Integrating the antenna body 101 with the metal frame of the mobile terminal saves space for the mobile terminal while ensuring the sensitivity of the antenna 100 in signal transmission. Therefore, the mobile terminal can be miniaturized and thin.

Figure 4:
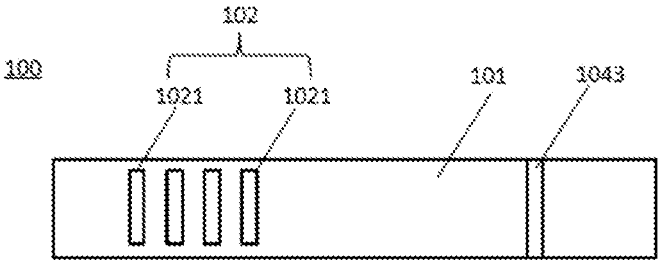
FIG. 4 illustrates a schematic top view of an antenna according to an exemplary embodiment of the disclosure.
Figure 5:
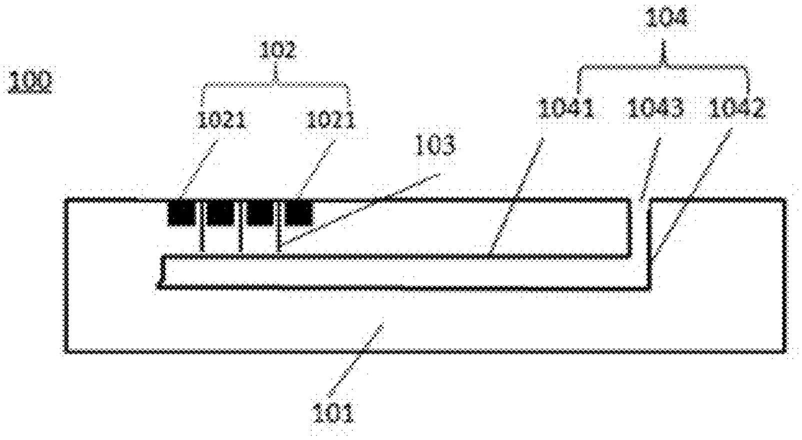
FIG. 5 illustrates a schematic front view of an antenna according to an exemplary embodiment of the disclosure.

FIG. 4 illustrates a schematic top view of another antenna 100 according to an exemplary embodiment of the disclosure. FIG. 5 illustrates a schematic front view of the antenna 100 illustrated in FIG. 4 according to an exemplary embodiment of the disclosure.

In an exemplary embodiment of the disclosure, as illustrated in FIG. 4 and FIG. 5, the antenna 100 may further include a second antenna 104. The second antenna 104 is configured to transmit signals in the form of 2G/3G/4G waves. An operating band of 2G/3G/4G waves is 699 MHz to 2690 MHz.

The second antenna 104 may include a first antenna branch 1041 and a second antenna branch 1042. The first antenna branch 1041 and the second antenna branch 1042 may be made of a metal material, and are integrally formed into an L shape.

Further, the second antenna branch 1042 may be connected to the antenna body 101, and a first slot 1043 is provided at a junction of the second antenna branch 1042 and the antenna body 101. The second antenna 104 can transmit signals in the form of 2G/3G/4G waves to the exterior through the first slot 1043.

It is to be noted that the first slot 1043 may penetrate through the antenna body 101.

By means of the arrangement, the antenna 100 can transmit both signals in the form of 2G/3G/4G waves and signals in the form of 5G millimeter waves.

The antenna 100 may be applied to a variety of mobile terminals, so as to ensure effective transmission of 5G millimeter waves and 2G/3G/4G waves by the mobile terminals.

Figure 6:
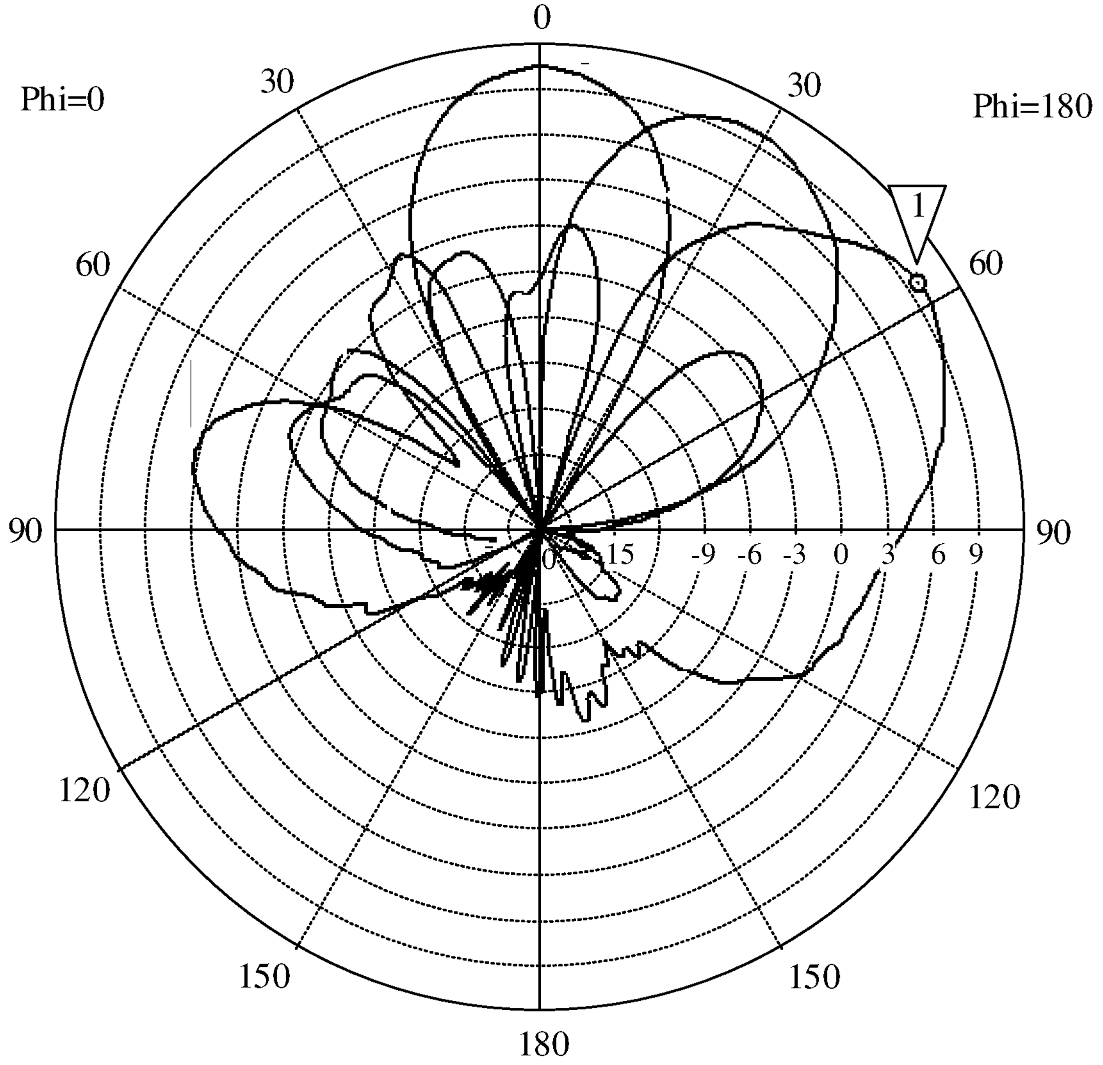
FIG. 6 illustrates a schematic diagram of a result of main lobe attenuation in antenna scanning according to an exemplary embodiment of the disclosure.

FIG. 6 illustrates a schematic diagram of a result of main lobe attenuation in antenna scanning according to an exemplary embodiment of the disclosure.

As illustrated in FIG. 6, by controlling a phase and an amplitude of a feed of the antenna 100 according to the disclosure, the array 102 of slot antenna units can perform scanning within a range of ±60°, while ensuring that main lobe attenuation is lower than 1 dB. Therefore, transmission of 5G millimeter waves can be improved by the antenna 100 in the disclosure.

A mobile terminal is provided in an exemplary embodiment of the disclosure. The mobile terminal includes a metal frame and an antenna. The antenna is the antenna 100 described above. The antenna body 101 of the antenna 100 may be part of the metal frame of the mobile terminal.

By means of the arrangement, the mobile terminal can transmit signals in the form of 5G millimeter waves, so as to realize a high data rate and a reduced delay of signal transmission, power saving, reduced costs and an improved system capacity of the mobile terminal.

The mobile terminal may be a mobile phone or a tablet.

In an exemplary embodiment of the disclosure, the antenna body 101 may be: part or all of a bottom of the metal frame of the mobile terminal, part or all of a top of the metal frame of the mobile terminal opposite to the bottom, or part or all of two sides of the metal frame of the mobile terminal other than the bottom and the top. That is to say, the antenna 100 may be arranged at the bottom, top or two sides of the metal frame of the mobile terminal. By arranging the antenna 100 at the bottom, top, or two sides of the metal frame of the mobile terminal, the antenna 100 is arranged at an insignificant position of the mobile terminal. The aesthetics of the appearance of the mobile terminal can be ensured while ensuring the sensitivity of the mobile terminal in signal transmission.

Other embodiments of the disclosure will be apparent to those skilled in the art from consideration of the specification and practicing the disclosure here. The disclosure is intended to cover any variations, uses, or adaptations of the present disclosure following the general principles thereof and including such departures from the present disclosure as come within known or customary practice in the art. The specification and embodiments are merely exemplary, and the true scope and spirit of the disclosure are specified by the appended claims.

It should be understood that the disclosure is not limited to the exact construction that has been described above and illustrated in the accompanying drawings, and modifications and changes may be made thereto without departing from the scope thereof. The scope of the disclosure is defined by the appended claims.

What is claimed is:

1. An antenna, comprising:

an antenna body;

a plurality of slot antenna units provided on the antenna body and arranged to be a slot antenna array, wherein each of the plurality of slot antenna units comprises a cavity formed within the antenna body and a first slot penetrating through a surface of the antenna body, the first slot and the cavity have sizes to enable transmission of millimeter waves in 5th generation (5G) mobile communication, and the antenna body is part of a metal frame of a mobile terminal, and the first slot is provided on the antenna body; and a second antenna, a second slot being provided at a junction of the second antenna and the antenna body, and the second antenna being configured to transmit a signal in a form of at least one of 2nd generation (2G), 3rd generation (3G), or 4th generation (4G) waves through the second slot;

wherein the second antenna comprises a first antenna branch and a second antenna branch; the first antenna branch and the second antenna branch are integrally formed into an L shape; the second antenna branch is connected to the antenna body; and the second slot penetrating through the antenna body is provided at a junction of the second antenna branch and the antenna body, and the first slot is different from the second slot.

2. The antenna according to claim 1, wherein:

a length of the first slot is greater than or equal to ¼ of an operating wavelength and is smaller than or equal to ¾ of the operating wavelength, a width of the first slot is smaller than or equal to 1/16 of the operating wavelength, and the operating wavelength is determined according to a wavelength of waves transmitted by the slot antenna array.

3. The antenna according to claim 2, wherein the length of the first slot is ½ of the operating wavelength.

4. The antenna according to claim 1, wherein:

the cavity is of a cubic shape; and a size of the cavity is determined according to correspondences between standard guided waves and sizes of flanges.

5. The antenna according to claim 1, wherein the first slot is filled with a dielectric material having a dielectric constant greater than 4 and a dielectric loss lower than 2%.

6. The antenna according to claim 2, wherein the operating wavelength is the wavelength of the waves transmitted by the slot antenna array.

7. The antenna according to claim 5, wherein the operating wavelength is determined according to the wavelength of the waves transmitted by the slot antenna array and the dielectric constant of the dielectric material filled in the first slot.

8. The antenna according to claim 1, wherein the cavity of the slot antenna unit is filled with a dielectric material having a dielectric constant greater than 4 and a dielectric loss lower than 2%.

9. The antenna according to claim 1, wherein the antenna body is further provided with an isolation member arranged between adjacent ones of the plurality of slot antenna units.

10. The antenna according to claim 1, wherein an interval between slots of adjacent ones of the plurality of slot antenna units is within a range of ½ to one wavelength of waves transmitted by the slot antenna array.

11. A mobile terminal, comprising:

a metal frame, and an antenna, comprising:

an antenna body;

a plurality of slot antenna units provided on the antenna body and arranged to be a slot antenna array, wherein each of the plurality of slot antenna units comprises a cavity formed within the antenna body and a first slot penetrating through a surface of the antenna body, the first slot and the cavity have sizes to enable transmission of millimeter waves in 5th generation (5G) mobile communication, and the antenna body is part of the metal frame, and the first slot is provided on the antenna body; and a second antenna, a second slot being provided at a junction of the second antenna and the antenna body, and the second antenna being configured to transmit a signal in a form of at least one of 2nd generation (2G), 3rd generation (3G), or 4th generation (4G) waves through the second slot;

wherein the second antenna comprises a first antenna branch and a second antenna branch; the first antenna branch and the second antenna branch are integrally formed into an L shape; the second antenna branch is connected to the antenna body; and the second slot penetrating through the antenna body is provided at a junction of the second antenna branch and the antenna body, and the first slot is different from the second slot.

12. The mobile terminal according to claim 11, wherein the antenna body is:

part or all of a bottom of the metal frame, part or all of a top of the metal frame opposite to the bottom, or part or all of two sides of the metal frame other than the bottom and the top.

13. The mobile terminal according to claim 11, wherein:

a length of the first slot is greater than or equal to ¼ of an operating wavelength and is smaller than or equal to ¾ of the operating wavelength, a width of the first slot is smaller than or equal to 1/16 of the operating wavelength, and the operating wavelength is determined according to a wavelength of waves transmitted by the slot antenna array.

14. The mobile terminal according to claim 13, wherein the length of the first slot is ½ of the operating wavelength.

15. The mobile terminal according to claim 11, wherein:

the cavity is of a cubic shape; and a size of the cavity is determined according to correspondences between standard guided waves and sizes of flanges.

16. The mobile terminal according to claim 11, wherein the first slot is filled with a dielectric material having a dielectric constant greater than 4 and a dielectric loss lower than 2%.

17. The mobile terminal according to claim 13, wherein the operating wavelength is the wavelength of the waves transmitted by the slot antenna array.

18. The mobile terminal according to claim 16, wherein the operating wavelength is determined according to the wavelength of the waves transmitted by the slot antenna array and the dielectric constant of the dielectric material filled in the first slot.

19. The mobile terminal according to claim 11, wherein the cavity of the slot antenna unit is filled with a dielectric material having a dielectric constant greater than 4 and a dielectric loss lower than 2%.

20. The mobile terminal according to claim 11, wherein the antenna body is further provided with an isolation member arranged between adjacent ones of the plurality of slot antenna unit.

* * * * *